US010919114B2

(12) United States Patent
Levine

(10) Patent No.: US 10,919,114 B2
(45) Date of Patent: Feb. 16, 2021

(54) METHODS AND SUPPORT STRUCTURES LEVERAGING GROWN BUILD ENVELOPE

(71) Applicant: GENERAL ELECTRIC COMPANY, Schenectady, NY (US)

(72) Inventor: Rachel Levine, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 804 days.

(21) Appl. No.: 15/643,167

(22) Filed: Jul. 6, 2017

(65) Prior Publication Data

US 2019/0009368 A1    Jan. 10, 2019

(51) Int. Cl.
| | | |
|---|---|---|
| *B23K 26/342* | (2014.01) | |
| *B33Y 10/00* | (2015.01) | |
| *B23K 26/14* | (2014.01) | |
| *B23K 15/00* | (2006.01) | |
| *B23K 26/082* | (2014.01) | |
| *B22F 3/105* | (2006.01) | |
| *B29C 64/40* | (2017.01) | |
| *B29C 64/153* | (2017.01) | |

(52) U.S. Cl.
CPC .......... *B23K 26/342* (2015.10); *B22F 3/1055* (2013.01); *B23K 15/0086* (2013.01); *B23K 26/082* (2015.10); *B23K 26/14* (2013.01); *B29C 64/153* (2017.08); *B29C 64/40* (2017.08); *B33Y 10/00* (2014.12); *B22F 2003/1058* (2013.01)

(58) Field of Classification Search
CPC ............... B23K 26/342; B23K 26/082; B23K 15/0086; B23K 26/14; B33Y 10/00; B29C 64/153; B29C 64/40; B22F 3/1055; B22F 2003/1058

USPC ................ 219/121.66, 121.8, 121.85, 76.1
See application file for complete search history.

(56) References Cited

U.S. PATENT DOCUMENTS

| | | | | |
|---|---|---|---|---|
| 4,863,538 | A * | 9/1989 | Deckard | ............... B33Y 10/00 264/497 |
| 5,460,758 | A | 10/1995 | Langer et al. | |
| 6,341,952 | B2 | 1/2002 | Gaylo et al. | |
| 7,713,454 | B2 | 5/2010 | Larsson | |
| 8,691,333 | B2 | 4/2014 | Godfrey et al. | |
| 9,327,451 | B2 | 5/2016 | Teulet | |
| 2015/0367446 | A1 * | 12/2015 | Buller | ................. B23K 10/027 219/74 |
| 2016/0052057 | A1 | 2/2016 | Xu | |
| 2016/0129502 | A1 | 5/2016 | Varetti | |

(Continued)

FOREIGN PATENT DOCUMENTS

DE            19649865 C1      2/1998

*Primary Examiner* — Phuong T Nguyen
(74) *Attorney, Agent, or Firm* — Dinsmore & Shohl LLP

(57) ABSTRACT

The present disclosure generally relates to additive manufacturing systems and methods on a large-scale format. One aspect involves a method for fabricating an object. The method includes (a) irradiating a layer of powder in a build area above a build platform to form a fused region; (b) providing a subsequent layer of powder over the build area; (c) repeating steps (a) and (b) until at least a portion of the object, a support structure, and a build envelope are formed; and (d) removing the object from the build envelope and the support structure. The support structure extends from an inner surface of the build envelope to a location proximate a location of the object to be built.

12 Claims, 6 Drawing Sheets

(56) References Cited

U.S. PATENT DOCUMENTS

2016/0243644 A1    8/2016  Moneta et al.
2016/0319678 A1   11/2016  Staroselsky et al.

\* cited by examiner

METHODS AND SUPPORT STRUCTURES LEVERAGING GROWN BUILD ENVELOPE

INTRODUCTION

The present disclosure generally relates to methods and systems adapted to perform additive manufacturing ("AM") processes, for example by direct melt laser manufacturing ("DMLM"), on a larger scale format.

BACKGROUND

A description of a typical laser powder bed fusion process is provided in German Patent No. DE 19649865, which is incorporated herein by reference in its entirety. AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an irradiation emission directing device that directs an energy beam, for example, an electron beam or a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758, which are incorporated herein by reference, describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

FIG. 1 is schematic diagram showing a cross-sectional view of an exemplary conventional system 100 for direct metal laser sintering ("DMLS") or direct metal laser melting (DMLM). The apparatus 100 builds objects, for example, the part 122, in a layer-by-layer manner by sintering or melting a powder material (not shown) using an energy beam 136 generated by a source 120, which can be, for example, a laser for producing a laser beam, or a filament that emits electrons when a current flows through it. The powder to be melted by the energy beam is supplied by reservoir 126 and spread evenly over a powder bed 112 using a recoater arm 116 travelling in direction 134 to maintain the powder at a level 118 and remove excess powder material extending above the powder level 118 to waste container 128. The energy beam 136 sinters or melts a cross sectional layer of the object being built under control of an irradiation emission directing device, such as a galvo scanner 132. The galvo scanner 132 may comprise, for example, a plurality of movable mirrors or scanning lenses. The speed at which the laser is scanned is a critical controllable process parameter, impacting how long the laser power is applied to a particular spot. Typical laser scan speeds are on the order of 10 to 100 millimeters per second. The build platform 114 is lowered and another layer of powder is spread over the powder bed and object being built, followed by successive melting/sintering of the powder by the laser 120. The powder layer is typically, for example, 10 to 100 microns. The process is repeated until the part 122 is completely built up from the melted/sintered powder material.

The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of excess powder by, for example, blowing or vacuuming. Other post processing procedures include a stress release process. Additionally, thermal and chemical post processing procedures can be used to finish the part 122.

FIG. 2 shows a side view of an object 201 built in a conventional system 200 having a powder bed 202, which could be for example a powder bed as illustrated by element 112 of FIG. 1. The object 201 and a support 205 may be built up from the build platform 114. As the build platform 114 is lowered in the direction 215 and successive layers of powder are built up, the object 201 and the support 205 are formed in the bed 202. The object 201 includes an overhanging portion 210 that is built on tip of the support 205. Without the support 205, the overhanging portion 210 may not be built correctly in loose powder. The support 205 may contact the overhanging portion 210 or be separated by a thin layer of powder. The walls 203 of the powder bed 202 define the amount of powder needed to make a part. The weight of the powder within the build environment is one limitation on the size of parts being built in this type of apparatus. The amount of powder needed to make a large part may exceed the limits of the build platform 114 or make it difficult to control the lowering of the build platform by precise steps which is needed to make highly uniform additive layers in the object being built. Additionally, large supports may consume significant time and energy during the build process, only to be disposed of afterwards.

There remains a need for a large format powder manufacturing system that overcomes the above-mentioned problems.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure provides a method for fabricating an object. The method includes: (a) irradiating a layer of powder in a build area above a build platform to form a fused region; (b) providing a subsequent layer of powder over the build area; (c) repeating steps (a) and (b) until at least a portion of the object, a support structure, and a build envelope are formed; and (d) removing the object from the build envelope and the support structure. The support structure extends from an inner surface of the build envelope to a location proximate a location of the object to be built.

DETAILED DESCRIPTION

This detailed description and accompanying figures demonstrate some illustrative embodiments of the invention to aid in understanding. The invention is not limited to the embodiments illustrated in the figures, nor is it limited to the particular embodiments described herein.

The present invention relates to a method of supporting an object during additive manufacturing. The disclosed techniques are particularly useful for making large additively manufactured objects. A build envelope may be formed around the object and retain unfused powder for building the object. A support structure that extends from an inner surface of the build envelope to a location proximate a location of the object to be built may be grown from the build envelope. The support structure may support a later built portion of the object. Effectively, the build envelope may form a portion of the support for the object. Accordingly, resources such as unfused powder and time may be saved by reducing the size of a stand-alone support structure. The object may be removed from the build envelope and the support structure.

Figure 1:
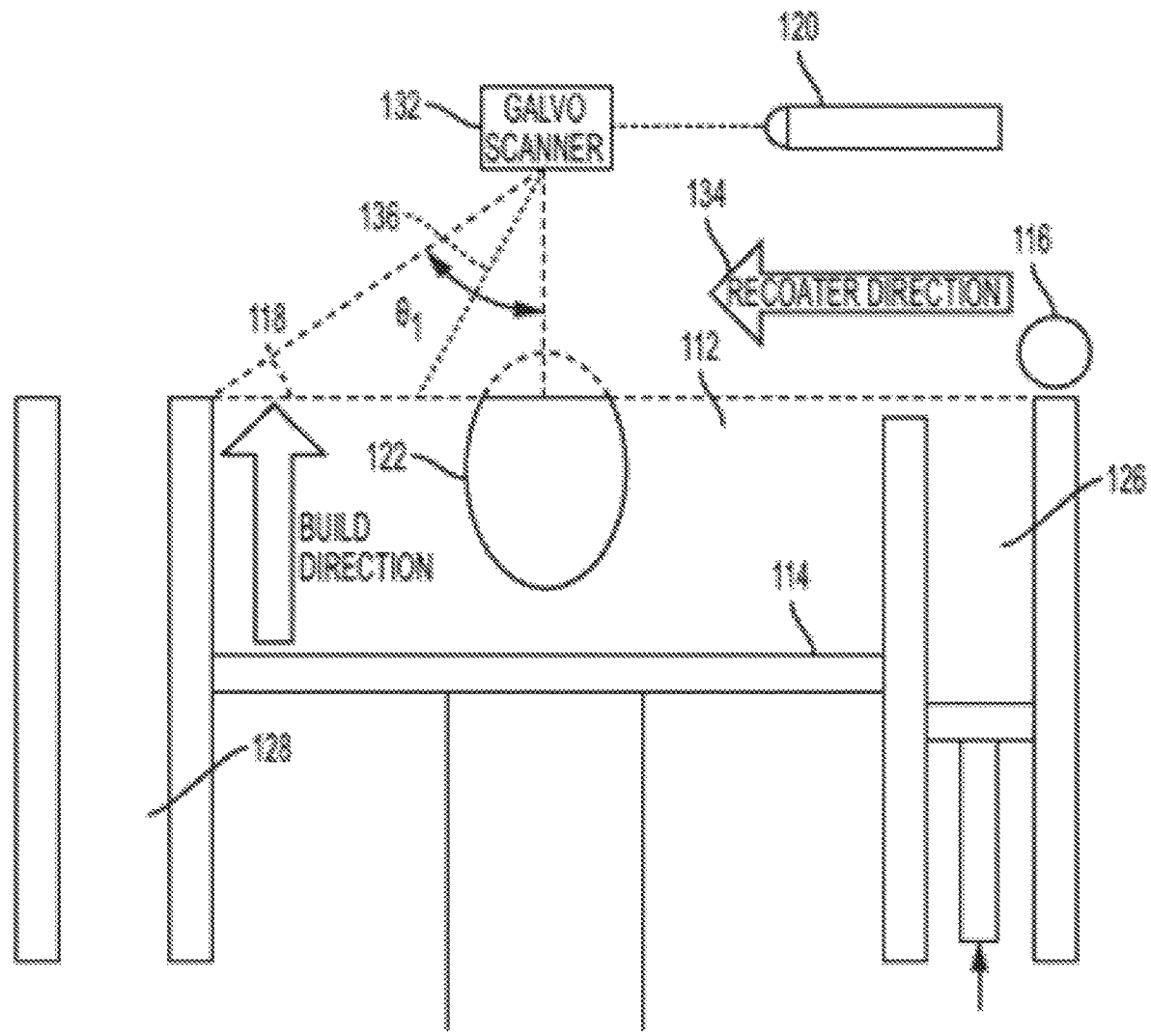
FIG. 1 shows an exemplary prior art system for DMLM using a powder bed.
Figure 2:
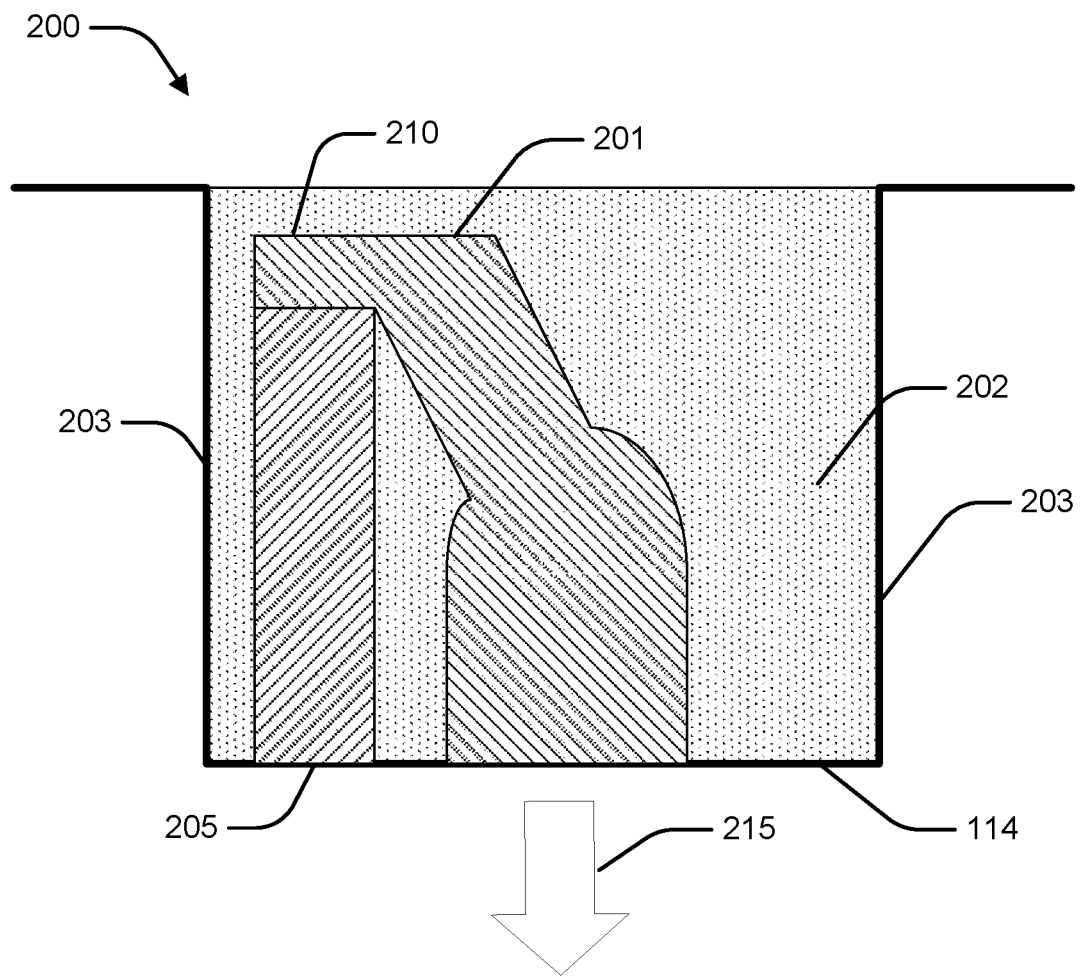
FIG. 2 shows a conventional powder bed that is moved down as the object is formed.
Figure 3:
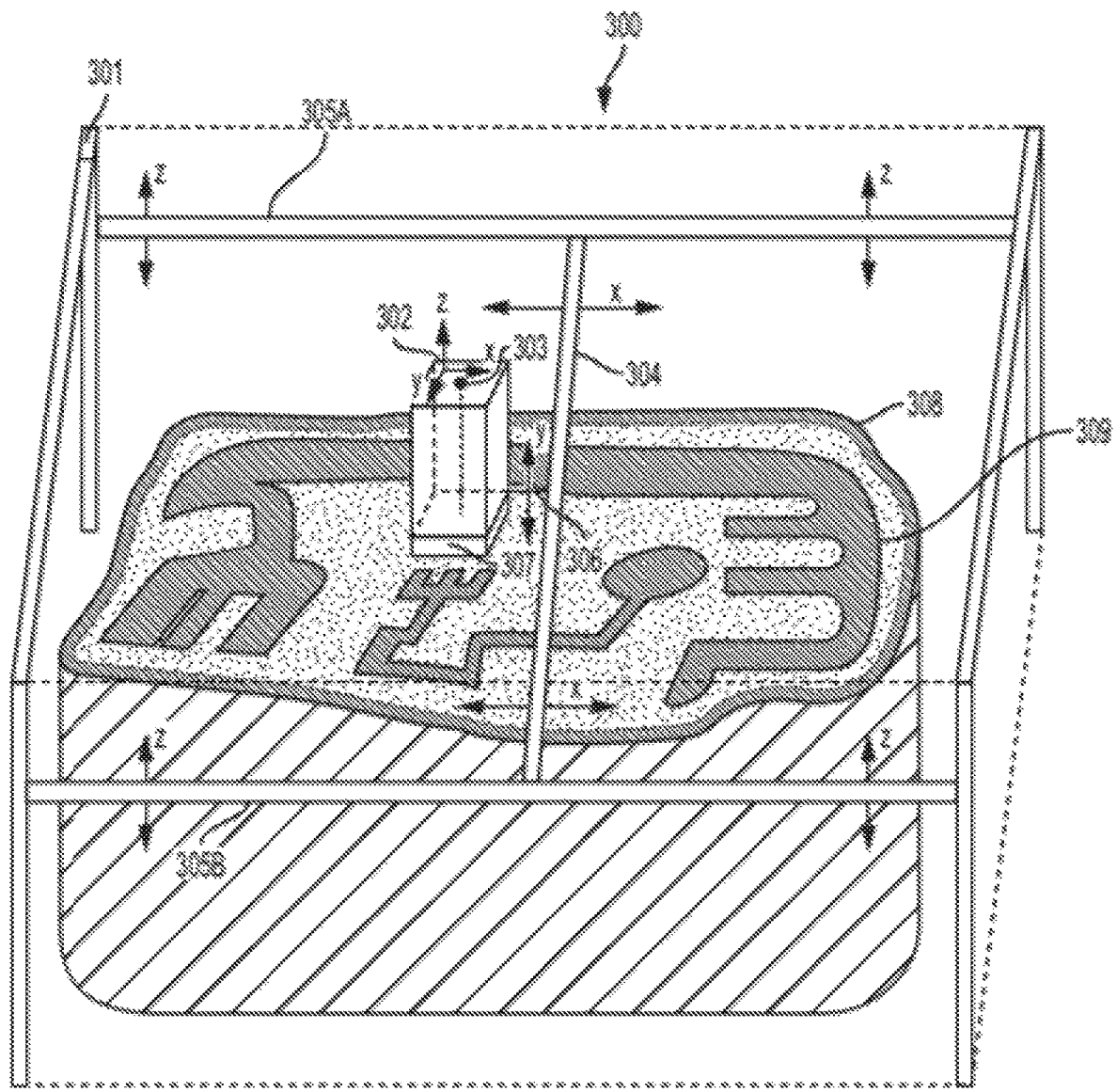
FIG. 3 shows a large scale additive manufacturing apparatus for use in accordance with an embodiment of the invention.

FIG. 3 shows an example of one embodiment of a large-scale additive manufacturing apparatus 300, which may be used in accordance with the present invention. The apparatus 300 comprises a positioning system 301, a build unit 302 comprising an irradiation emission directing device 303, a laminar gas flow zone 307, and a build plate (not shown in this view) beneath an object being built 309. The maximum build area is defined by the positioning system 301, instead of by a powder bed as with conventional systems, and the build area for a particular build can be confined to a build envelope 308 that may be dynamically built up along with the object. The positioning system 301 has an x crossbeam 304 that moves the build unit 302 in the x direction. There are two z crossbeams 305A and 305B that move the build unit 302 and the x crossbeam 304 in the z direction. The x crossbeam 304 and the build unit 302 are attached by a mechanism 306 that moves the build unit 302 in they direction. In this illustration of one embodiment of the invention, the positioning system 301 is a gantry, but the present invention is not limited to using a gantry. In general, the positioning system used in the present invention may be any multidimensional positioning system such as a delta robot, cable robot, robot arm, etc. The irradiation emission directing device 303 may be independently moved inside of the build unit 302 by a second positioning system (not shown). The atmospheric environment outside the build unit, i.e. the "build environment," or "containment zone," is typically controlled such that the oxygen content is reduced relative to typical ambient air, and so that the environment is at reduced pressure.

There may also be an irradiation source that, in the case of a laser source, originates the photons comprising the laser irradiation that is directed by the irradiation emission directing device. When the irradiation source is a laser source, then the irradiation emission directing device may be, for example, a galvo scanner, and the laser source may be located outside the build environment. Under these circumstances, the laser irradiation may be transported to the irradiation emission directing device by any suitable means, for example, a fiber-optic cable. When the irradiation source is an electron source, then the electron source originates the electrons that comprise the e-beam that is directed by the irradiation emission directing device. When the irradiation source is an electron source, then the irradiation emission directing device may be, for example, a deflecting coil. When a large-scale additive manufacturing apparatus according to an embodiment of the present invention is in operation, if the irradiation emission directing devices directs a laser beam, then generally it is advantageous to include a gas flow device providing substantially laminar gas flow to a gas flow zone 307. If an e-beam is used, then no gas flow is provided. An e-beam is a well-known source of irradiation. For example, U.S. Pat. No. 7,713,454 to Larsson titled "Arrangement and Method for Producing a Three-Dimensional Product" ("Larsson") discusses e-beam systems, and that patent is incorporated herein by reference. When the source is an electron source, then it is important to maintain sufficient vacuum in the space through which the e-beam passes. Therefore, for an e-beam, there is no gas flow across the gas flow zone 307.

In some embodiments, the build plate may be vertically stationary (i.e., in the z direction). This permits the build plate to support as much material as necessary, unlike the prior art methods and systems, which require some mechanism to raise and lower the build plate, thus limiting the amount of material that can be used. Accordingly, the techniques of the present invention are particularly suited for manufacturing an object within a large (e.g., greater than 1 m$^3$) build envelope. For instance, the build envelope may have a smallest xy cross sectional area greater than 500 mm$^2$, or preferably greater than 750 mm$^2$, or more preferably greater than 1 m$^2$. The size of the build envelope is not particularly limited. For instance, it could have a smallest cross sectional area as large as 100 m². Likewise, the formed object may have a largest xy cross sectional area that is no less than about 500 mm², or preferably no less than about 750 mm², or still more preferably no less than about 1 m². There is no particular upper limit on the size of the object. For example, the object's smallest xy cross sectional area may be as large as 100 m². Because the build envelope retains unfused powder about the object, it can be made in a way that minimizes unfused powder (which can potentially be wasted powder) within a particular build, which is particularly advantageous for large builds. When building large objects within a dynamically grown build envelope, it may be advantageous to build the envelope using a different build unit, or even a different build method altogether, than is used for the object. For example, it may be advantageous to have one build unit that directs an e-beam, and another build unit that directs a laser beam. With respect to the build envelope, precision and quality of the envelope may be relatively unimportant, such that rapid build techniques are advantageously used. In general, the build envelope may be built by any suitable means, for instance by metal inert gas (MIG) or tungsten inert gas (TIG) welding, wire deposition, or by laser powder deposition. If the build envelope is built by additive manufacturing, then a different irradiation emission directing device can be used to build the build envelope than is used to build the object. This is advantageous because building the build envelope may be done more quickly with a particular irradiation emission directing device and method, whereas a slower and more accurate directing device and method may be desired to build the object. For example, the build envelope may be rapidly built using a different material from the object, which may require a different build method. Ways to tune accuracy vs. speed of a build are well known in the art, and are not recited here.

Further details of exemplary apparatuses that may be used to perform the techniques disclosed herein are described in the following patent applications:

U.S. patent application Ser. No. 15/406,467, titled "Additive Manufacturing Using a Mobile Build Volume," and filed Jan. 13, 2017.

U.S. patent application Ser. No. 15/406,454, titled "Additive Manufacturing Using a Mobile Scan Area," and filed Jan. 13, 2017.

U.S. patent application Ser. No. 14/406,444, titled "Additive Manufacturing Using a Dynamically Grown Build Envelope," and filed Jan. 13, 2017.

U.S. patent application Ser. No. 15/406,461, titled "Additive Manufacturing Using a Selective Recoater," and filed Jan. 13, 2017.

U.S. patent application Ser. No. 15/406,471, titled "Large Scale Additive Machine," and filed Jan. 13, 2017.

The disclosure of each of these applications are incorporated herein in their entirety to the extent they disclose additional apparatuses that can be used in conjunction with the apparatus disclosed herein to make objects within a build environment having a build envelope.

Figure 4:
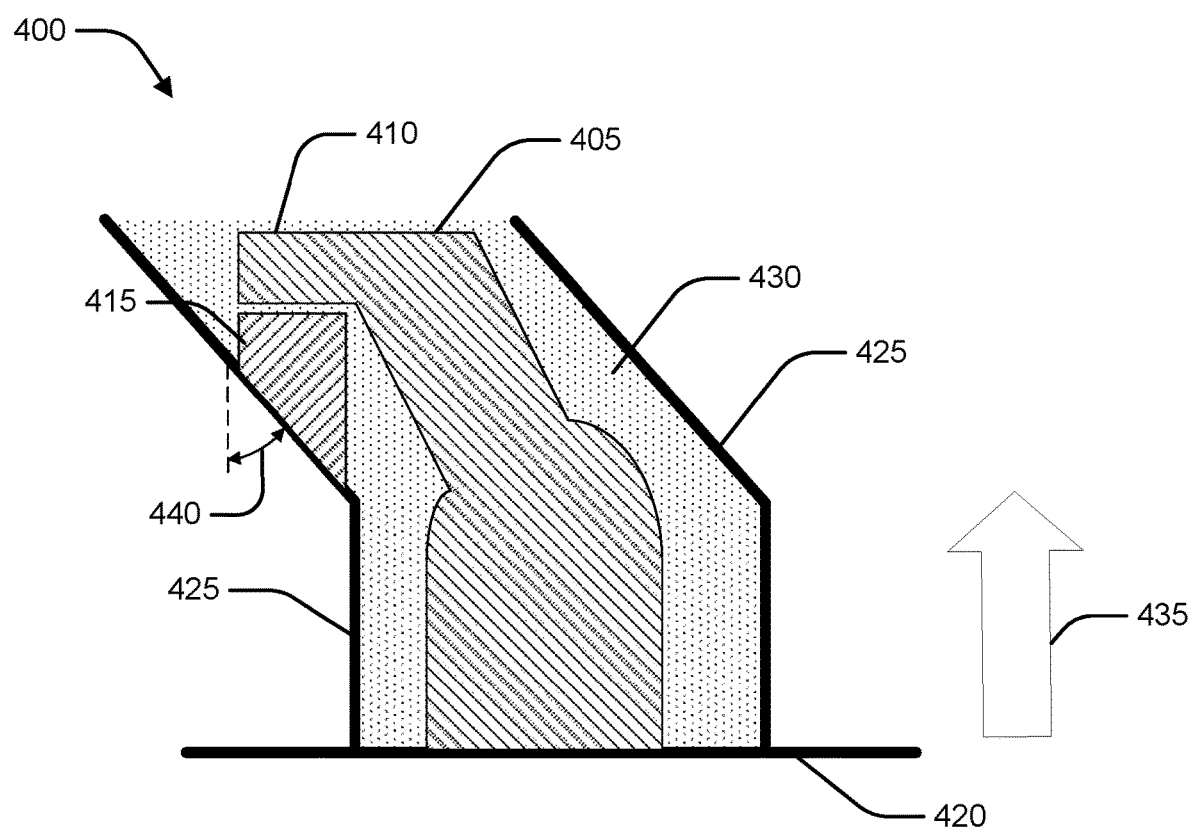
FIG. 4 shows an exemplary build environment including an object supported by a support structure extending from a build envelope, according to an embodiment of the invention.

FIG. 4 shows an exemplary build environment 400 including an object 405 partially supported by a support 415 extending from a build envelope 425. The build environment 400 may be a build environment for the apparatus 300. The build environment 400 is supported by a base 420. Unlike the build platform 114, the base 420 does not move. Instead, a build direction 435 extends upward from the base 420 as layers of powder are added to the base 420 and subsequently irradiated.

The build environment 400 includes a build envelope 425. The build envelope 425 retains powder 430 within the area defined by the build envelope 425. Powder outside of the build envelope 425 is at a lower level than the powder retained within the build envelope. In some embodiments, powder falling outside of the build envelope 425 is removed either continuously or between layers. The build envelope 425 extends vertically as each successive layer is added. The build envelope 425 may also extend radially inward, radially outward, or any combination of inward and outward at various locations. For example, in the illustrated cross-sectional view, the left side of the build envelope 425 extends radially outward (i.e., toward the left), while the right side of the build envelope 425 extends radially inward (i.e., toward the left). Accordingly, the build envelope 425 generally conforms to the planned shape of the object 405. The shape of the build envelope 425 may be subject to constraints depending on the technology used to build the build envelope 425. For example, the build envelope 425 may have a maximum angle 440 from vertical depending on the build process. For example, DMLM may limit the angle 440 at which the build envelope may extend radially outward due to the lack of powder outside of the build envelope 425, but extend inwardly at a greater angle. In contrast, welding, wire deposition, and powder deposition processes may extend radially outward at greater angles.

The techniques disclosed herein may be used to build a three-dimensional object of almost any shape. As illustrated, the exemplary object 405 may extend from the base 420 and include an overhanging portion 410. An overhanging portion may include any surface that is not supported underneath by another portion of the object. For example, an overhanging portion my extend at an angle from vertical greater than a threshold. The overhanging portion 410 may benefit from a support. For example, a support may prevent an initial layer of the overhanging portion 410 from moving or improve the surface quality of the overhanging portion 410.

The support 415 extends from an inner surface of the build envelope 425 to a location proximate the overhanging portion 410. It should be appreciated that when the support 415 is formed, the overhanging portion 410 has not yet been formed. Accordingly, the overhanging portion 410 may be formed above the support 415 and the support 415 may support the forming of the overhanging portion 410. The support 415 extends from the build envelope 425 at a height above the base 420. In comparison to the support structure 205, the support 415 may use fewer resources. For example, the support 415 may use less powder because the support 415 is shorter. Additionally, the support 415 may use less time and power because the support 415 does not need to be scanned in each of the layers between the base 420 and the start of the support 415. The support 415 may directly contact the build envelope 425. In an implementation where the same AM process is used to form the build envelope 425 and the support 415, the support 415 may be integrated with the build envelope 425. For example, the support 415 may be formed by designating a greater width for the build envelope 425 in the area of the support 415. In implementations where a different AM process is used to form the build envelope 425 and the support 415, the support 415 may be formed by irradiating the powder adjacent the build envelope 425. The irradiation may melt the powder as well as the surface of the build envelope 425, causing the support 415 to fuse to the build envelope.

In an aspect, the location of the build envelope 425 may be less accurate or less precise than the positioning of the object 405. For example, a welding process or wire deposition process may place a fixed size bead or wire on the build envelope 425. Although a beam (e.g., laser beam or e-beam) may be fairly certain of irradiating powder in the correct location when forming the support 415, interaction of the beam with the build envelope 425 may be less predictable. Accordingly, the support 415 may provide a buffer between the build envelope 425 and the object 405. By extending away from the build envelope 425, the support 415 may be positioned proximate the overhanging portion 410. For example, the support 415 may be separated from the overhanging portion 410 by a thin layer of powder, or the support 415 may contact the overhanging portion 410 at one or more points. Because the support 415 and the overhanging portion 410 are formed using the same AM process, the relative positions of the parts may be accurately and precisely controlled.

Figure 5:
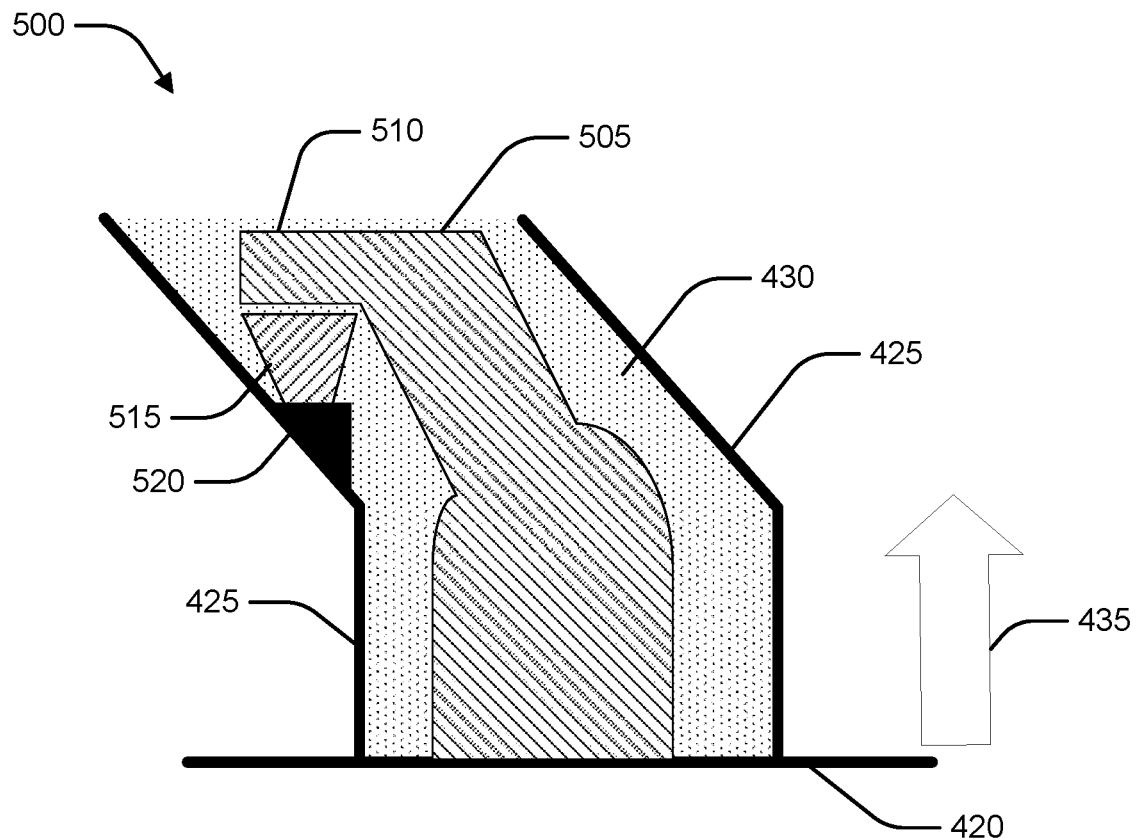
FIG. 5 shows an exemplary build environment including an objected supported by support structure extending from a ledge of a build envelope, according to an embodiment of the invention.

FIG. 5 shows an exemplary build environment 500 including an object 505 having an overhanging portion 510 supported by a support structure 515 extending from a ledge 520 of a build envelope 425. The build environment 500 may be a build environment for the apparatus 300. The build environment 500 may include the base 420, build envelope 425, and powder 430 similar to the build environment 400. The object 505 may have the same shape as the object 405 or another shape.

The build environment 500 also includes a ledge 520 extending radially inward from the build envelope 425. The ledge 520 has a horizontal top surface for supporting the support 515. The ledge 520 may be formed using the same AM process as the build envelope 425, and the support 515 may be formed by a different AM processes that is also used to form the object 505. The support 515 may be formed by fusing the powder 430 in the area of the support 515 on top of the ledge 520. The horizontal top surface of the ledge 520 provides a stable platform for fusing the powder 430. For example, even if the alignment of different AM processes is offset and the bottom of the support 515 does not directly contact the ledge 520, the horizontal top surface of the ledge 520 may still allow formation of the support 515. Additionally, the increased thickness of the build envelope 425 due to the ledge 520 may prevent damage to the build envelope 425 when the adjacent powder is melted.

Figure 6:
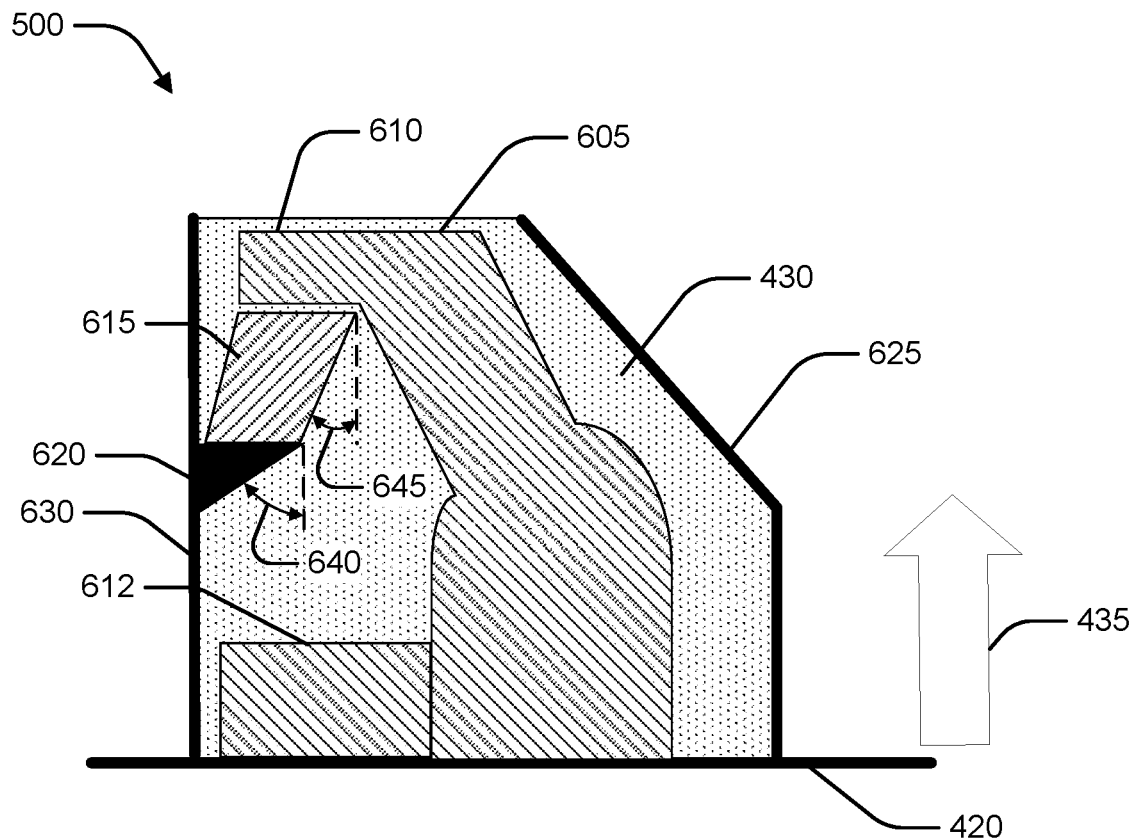
FIG. 6 shows an exemplary build environment including an object supported by a support structure extending from a vertical wall of a build envelope, according to an embodiment of the invention.

FIG. 6 shows an exemplary build environment 600 including an object 605 supported by a support 615 extending from a ledge 620 of a build envelope 625. The build environment 600 may be a build environment for the apparatus 300. The build environment 600 may include the base 420 and powder 430 similar to the build environment 400. The build envelope 625 may have a different shape than the build envelope 425. For example, the build envelope 625 may have a vertical wall 630. The object 605 may include an overhanging portion 610 supported by the support 615. The object 605 may also include a projection 612 that results in a wider base of build envelope 625 in comparison to the build envelope 425. The ledge 620 extends from an inner surface of the build envelope 625 over the projection 612. Similar to the ledge 520, the ledge 620 may be formed using the same AM process as the build envelope 625. The ledge 620 may extend radially inward at a first angle 640 based on the AM process of the build envelope 625. The support 615 may be formed on top of the ledge 620 using a second AM process (e.g., DMLM). The support 615 may extend radially inward at a second angle 645 based on constraints of the second DMLM process. Accordingly, the position and size of the ledge 620 may be determined based on the overhanging portion 610 to support and the constraints of the respective AM build processes.

In an aspect, multiple supports may be used in combination to support fabrication of an object, prevent movement of the object, and/or control thermal properties of the object. That is, fabricating an object using additive manufacturing may include use of one or more of: scaffolding, tie-down supports, break-away supports, lateral supports, conformal supports, connecting supports, surrounding supports, keyway supports, breakable supports, leading edge supports, or powder removal ports. The following patent applications include disclosure of these supports and methods of their use:

U.S. patent application Ser. No. 15/042,019, titled "METHOD AND CONFORMAL SUPPORTS FOR ADDITIVE MANUFACTURING" and filed Feb. 11, 2016;

U.S. patent application Ser. No. 15/042,024, titled "METHOD AND CONNECTING SUPPORTS FOR ADDITIVE MANUFACTURING" and filed Feb. 11, 2016;

U.S. patent application Ser. No. 15/041,973, titled "METHODS AND SURROUNDING SUPPORTS FOR ADDITIVE MANUFACTURING" and filed Feb. 11, 2016;

U.S. patent application Ser. No. 15/042,010, titled "METHODS AND KEYWAY SUPPORTS FOR ADDITIVE MANUFACTURING" and filed Feb. 11, 2016;

U.S. patent application Ser. No. 15/042,001, titled "METHODS AND BREAKABLE SUPPORTS FOR ADDITIVE MANUFACTURING" and filed Feb. 11, 2016;

U.S. patent application Ser. No. 15/335,116, titled "METHODS AND THERMAL STRUCTURES FOR ADDITIVE MANUFACTURING" and filed Oct. 26, 2016;

U.S. patent application Ser. No. 15/041,991, titled "METHODS AND LEADING EDGE SUPPORTS FOR ADDITIVE MANUFACTURING" and filed Feb. 11, 2016; and U.S. patent application Ser. No. 15/041,980, titled "METHOD AND SUPPORTS WITH POWDER REMOVAL PORTS FOR ADDITIVE MANUFACTURING" and filed Feb. 11, 2016.

The disclosure of each of these applications are incorporated herein in their entirety to the extent they disclose additional support structures that can be used in conjunction with the support structures disclosed herein to make other objects.

Additionally, scaffolding includes supports that are built underneath an object to provide vertical support to the object. Scaffolding may be formed of interconnected supports, for example, in a honeycomb pattern. In an aspect, scaffolding may be solid or include solid portions. The scaffolding contacts the object at various locations providing load bearing support for the object to be constructed above the scaffolding. The contact between the support structure and the object also prevents lateral movement of the object.

Tie-down supports prevent a relatively thin flat object, or at least a first portion (e.g. first layer) of the object from moving during the build process. Relatively thin objects are prone to warping or peeling. For example, heat dissipation may cause a thin object to warp as it cools. As another example, the recoater may cause lateral forces to be applied to the object, which in some cases lifts an edge of the object. In an aspect, the tie-down supports are built beneath the object to tie the object down to an anchor surface. For example, tie-down supports may extend vertically from an anchor surface such as the platform to the object. The tie-down supports are built by melting the powder at a specific location in each layer beneath the object. The tie-down supports connect to both the platform and the object (e.g., at an edge of the object), preventing the object from warping or peeling. The tie-down supports may be removed from the object in a post-processing procedure.

A break-away support structure reduces the contact area between a support structure and the object. For example, a break-away support structure may include separate portions, each separated by a space. The spaces may reduce the total size of the break-away support structure and the amount of powder consumed in fabricating the break-away support structure. Further, one or more of the portions may have a reduced contact surface with the object. For example, a portion of the support structure may have a pointed contact surface that is easier to remove from the object during post-processing. For example, the portion with the pointed contact surface will break away from the object at the pointed contact surface. The pointed contact surface stills provides the functions of providing load bearing support and tying the object down to prevent warping or peeling.

Lateral support structures are used to support a vertical object. The object may have a relatively high height to width aspect ratio (e.g., greater than 1). That is, the height of the object is many times larger than its width. The lateral support structure is located to a side of the object. For example, the object and the lateral support structure are built in the same layers with the scan pattern in each layer including a portion of the object and a portion of the lateral support structure. The lateral support structure is separated from the object (e.g., by a portion of unmelted powder in each layer) or connected by a break-away support structure. Accordingly, the lateral support structure may be easily removed from the object during post-processing. In an aspect, the lateral support structure provides support against forces applied by the recoater when applying additional powder. Generally, the forces applied by the recoater are in the direction of movement of the recoater as it levels an additional layer of powder. Accordingly, the lateral support structure is built in the direction of movement of the recoater from the object. Moreover, the lateral support structure may be wider at the bottom than at the top. The wider bottom provides stability for the lateral support structure to resist any forces generated by the recoater.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method for fabricating an object, comprising:
    (a) irradiating a layer of powder in a build area above a build platform to form a fused region;
    (b) providing a subsequent layer of powder over the build area;
    (c) repeating steps (a) and (b) until at least a portion of each of the object, a support structure, and a build envelope that retains unfused powder about the object are formed, wherein the support structure extends from and is dynamically grown from an inner surface of the build envelope to a location proximate a location of the object to be built;
    (d) removing the object from the build envelope and the support structure; and
    (e) removing unfused powder outside of the build envelope.

2. The method of claim 1, wherein the build envelope includes a horizontal surface extending inwardly.

3. The method of claim 2, wherein the support structure is formed on top of the horizontal surface.

4. The method of claim 1, wherein the build envelope is formed by a second process different than irradiating the layer of powder.

5. The method of claim 4, wherein the second process is one of welding, wire deposition, or laser powder deposition.

6. The method of claim 4, wherein the build envelope includes a vertical wall and a horizontal surface extending inwardly from the vertical wall.

7. The method of claim 6, wherein step (a) includes irradiating a layer of powder adjacent the build envelope, wherein the fused region is fused to the build envelope.

8. The method of claim 1, wherein the build envelope extends outward from the build area in the location of the support structure.

9. The method of claim 1, wherein the support structure is spaced above a build platform.

10. The method of claim 1, wherein the build envelope retains unfused powder within the build envelope at a height greater than unfused powder outside of the build envelope.

11. The method of claim 1, wherein the support structure contacts the portion of the object.

12. The method of claim 1, wherein the support structure is separated from the portion of the object by a portion of unfused powder.

* * * * *